United States Patent
Rinne et al.

(10) Patent No.: US 6,725,058 B2
(45) Date of Patent: Apr. 20, 2004

(54) INTERSYSTEM HANDOVER

(75) Inventors: Mikko Rinne, Helsinki (FI); Timo Ali-Vehmas, Salo (FI)

(73) Assignee: Nokia Corporation, Espoo (FI)

( * ) Notice: Subject to any disclaimer, the term of this patent is extended or adjusted under 35 U.S.C. 154(b) by 29 days.

(21) Appl. No.: 10/034,339

(22) Filed: Dec. 26, 2001

(65) Prior Publication Data

US 2003/0119550 A1 Jun. 26, 2003

(51) Int. Cl.[7] ............................. H04B 1/38; H04M 1/00; H04Q 7/20
(52) U.S. Cl. ........................ 455/553.1; 455/552.1; 455/438; 455/432.1; 370/331
(58) Field of Search .................... 455/553, 552, 455/550, 436–440, 442–446, 450, 432.1, 432.2, 433, 452.1, 552.1, 553.1; 370/331, 332, 333, 465–467

(56) References Cited

U.S. PATENT DOCUMENTS

| | | | |
|---|---|---|---|
| 5,594,718 A | * | 1/1997 | Weaver et al. .............. 370/331 |
| 5,978,679 A | * | 11/1999 | Agre .......................... 455/442 |
| 6,240,292 B1 | * | 5/2001 | Haberman et al. .......... 455/439 |
| 2001/0008523 A1 | | 7/2001 | Song .......................... 370/335 |
| 2001/0016482 A1 | | 8/2001 | Bergstrom et al. .......... 455/332 |
| 2002/0093922 A1 | * | 7/2002 | Grilli et al. ................. 370/328 |
| 2002/0160785 A1 | * | 10/2002 | Ovesjo et al. .............. 455/453 |
| 2002/0177466 A1 | * | 11/2002 | Laurila et al. .............. 455/552 |
| 2003/0002525 A1 | * | 1/2003 | Grilli et al. ................. 370/465 |

OTHER PUBLICATIONS

3G TS 23.009 v3.2.1 (May 2000); 3rd Generation Partnership Project; Technical Specification Group Core Network; Handover Procedures (Release 1999).
3GPP TR 25.922 v4.1.0 (Sep. 2000); 3rd Generation Partnership Project; Technical Specification Group Radio Access Network; Radio Resource Management Strategies (Release 4).
3GPP TS 23.009 v4.2.0 (Sep. 2001); 3rd Generation Partnership Project; Technical Specification Group Core Network; Handover Procedures (Release 4).

* cited by examiner

Primary Examiner—Nay Maung
Assistant Examiner—Edan Orgad
(74) Attorney, Agent, or Firm—Ware, Fressola, Van Der Sluys, and Adolphson, LLP

(57) ABSTRACT

Inter-system handover, for instance from WCDMA to GSM, is facilitated by transmitting a pilot from each neighboring GSM cell on the WCDMA carrier, thereby avoiding any need for a dual-system mobile station.

15 Claims, 1 Drawing Sheet

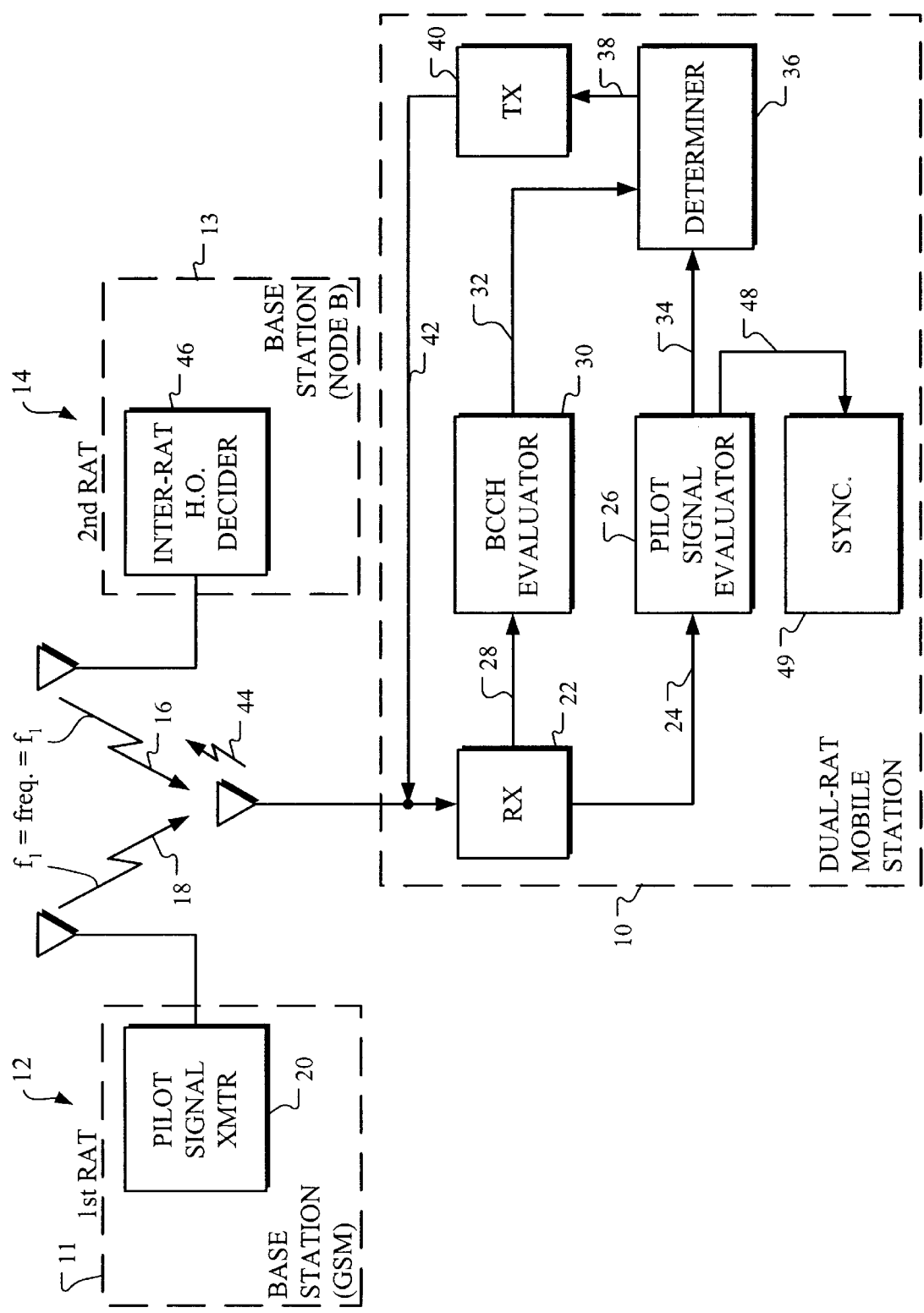

INTERSYSTEM HANDOVER

BACKGROUND OF THE INVENTION

1. Technical Field

The present invention relates to inter-system handover between two different radio access technologies (RATs) and, more particularly, an inter-system handover accomplished by a dual-system mobile phone capable of communicating with both systems without needing a dual receiver and without needing to use compression/special gaps created in transmission of the originating system to allow measurement of the target system during breaks.

2. Discussion of Related Art

In order to be able to interoperate between mobile telecommunications systems using distinct radio access technologies (RATs) it is necessary to have a dual-system mobile phone capable of communicating with both RATs. Before a handover between two RATs can be initiated the quality of the signal from a new cell in the target RAT has to be measured and compared to the old cell. Doing this measurement requires special arrangements in systems that use continuous transmission and reception on dedicated channels. One prior art approach to solving the problem of how to make measurements on the target RAT while at the same time receiving continuously in the originating RAT is to provide two receivers in the mobile station so that one receiver can be receiving a signal from the target RAT for evaluation in parallel with the continuous reception from the originating RAT. In this way, an active transmission of audio in a speech call for instance can be ongoing while the mobile phone is at the same time receiving and evaluating a signal from the candidate target RAT. Another prior art alternative is to create gaps in the downlink of the originating RAT using compression techniques so as to allow measurements of the target RAT during the gaps. Implementing dual receivers increases terminal cost and to some extent also power consumption. Compressed mode allows only limited length measurement gaps and forces a rise in transmission power of the compressed part to maintain the original transmission data rate. In some cases the data rate may need to be dropped to prevent exceeding the terminal maximum power or creating unsustainable interference to neighbors in the originating system.

DISCLOSURE OF INVENTION

An objective of the present invention is to facilitate inter-system handover while avoiding the above-mentioned disadvantages of the prior art.

According to a first aspect of the present invention, inter-system handover between two mobile telecommunications systems using distinct radio access technologies is facilitated by transmitting a pilot signal from a base station of a first radio access technology (RAT) used in a first mobile telecommunications system on a carrier having a frequency used by a second RAT used in a second mobile telecommunications system, and by receiving the pilot signal in a dual-system mobile station capable of operating in both the first mobile telecommunications system using the first RAT and in the second mobile telecommunications system using the second RAT for evaluating the pilot signal for determining whether to carry out an inter-system handover from operating the mobile station in the second mobile telecommunications system using the second RAT to operating the mobile station in the first telecommunications system using the first RAT.

In further accord with the first aspect of the present invention, the dual-system mobile station, in furtherance of the determination of whether to carry out an inter-system handover, measures the signal strength of the pilot signal. Further, it may measure the signal strength of the downlink from the second RAT. A power ratio may furthermore be determined between the pilot signal and the carrier of the second RAT. This information may be used in the mobile station in determining whether to efect an inter-system handover or may be communicated on an uplink of the second RAT to the second telecommunications system for making an inter-system handover decision at the network level. If such a determination is made at the network level it will be communicated on a downlink back to the dual-RAT mobile station.

In still further accord with the first aspect of the present invention, the pilot signal communicated from the first RAT to the dual-RAT mobile station may include synchronization information for enabling the dual-RAT mobile station to synchronize with the first RAT in the event of an inter-RAT handover decision.

According to a second aspect of the present invention, a dual-system mobile station capable of operating in both a first mobile telecommunications system using a first radio access technology (RAT) and in a second mobile telecommunications system using a second RAT comprises a receiver for receiving a pilot signal for providing a signal of a magnitude indicative thereof; and a pilot signal evaluator, responsive to the pilot signal from the receiver for evaluating the pilot signal for determining whether to carry out an inter-system handover from operating the mobile station in the second mobile telecommunications system using the second RAT to operating the mobile station in the first telecommunications system using the first RAT and for providing a signal indicative thereof.

In further accord with the second aspect of the present invention, the signal provided by the evaluator is indicative of a measured signal strength of the pilot signal and wherein the mobile station further comprises a determiner for comparing the pilot signal strength to the signal strength of a carrier of the second mobile telecommunications system using the second RAT, for providing a power ratio signal for transmission to the second mobile telecommunications system using the second RAT, for use by said second mobile telecommunications system using the second RAT in deciding whether to carry out the inter-system handover.

In still further accord with the second aspect of the present invention, the mobile station further comprises an evaluator responsive to a signal from the receiver having a magnitude indicative of the strength of a broadcast signal from the second mobile telecommunications system using the second RAT for providing a signal having a magnitude indicative of said signal strength of said broadcast signal.

According to a third aspect of the present invention, a base station of a second generation mobile telecommunication system having an antenna for radiating signals to mobile stations in a cell thereof is characterized by a pilot signal transmitter for transmitting a pilot signal having a carrier frequency identical to that of a radio access technology of a third generation mobile telecommunication system for conveying information relating to its identity and the configuration parameters needed by a dual-system mobile station capable of operating in both said second and third mobile telecommunications systems for use in making a handover decision to change from operating in said third generation mobile telecommunication system to operating in said second generation mobile telecommunications system.

It will be appreciated that measurements can be made by the original system of the target RAT to determine the pilot strength and synchronization of the target system by receiving the special transmission of the present invention on the channel of the original system. In this way costly dual receivers are avoided in the mobile station or the alternative compression of frame transmission is to allow measurement gaps is avoided.

Network-related disadvantages would however include adding the necessary means to transmit for instance a GSM pilot and synchronization information on a WCDMA carrier, the need to co-site the for instance GSM cells with the cells from which the measurements are made (e.g., WCDMA), and the disadvantage of areas around, e.g., the GSM cells becoming "shadow regions" when the GSM pilot on the WCDMA band blocks the reception of the WCDMA cell. Another disadvantage is the need to standardize this concept.

Although a specific example is shown relating to GSM/WCDMA, it should be realized that the present invention is broadly applicable to inter-system handover between second, third, fourth, etc. generation radio access technologies.

These and other objects, features and advantages of the present invention will become more apparent in light of the following detailed description of a best mode embodiment thereof, as illustrated in the accompanying drawing.

BRIEF DESCRIPTION OF THE DRAWING

The sole FIGURE shows a way to carry out an inter-system handover for use in two mobile telecommunications systems using distinct radio access technologies, according to the present invention, as well as base stations and a dual-mode mobile station.

BEST MODE FOR CARRYING OUT THE INVENTION

The FIGURE shows a dual-radio access technology (RAT) mobile station 10 capable of communicating with a base station 11 according to a first RAT 12 and a base station 13 according to a second RAT 14. As in the prior art, in support of inter-system handovers (inter-RAT), a mobile station connected to a cell for instance of the second RAT 14 has to perform measurements on cells transmitting the signal of another RAT such as the RAT 12 of the figure. A downlink part of such a connection between the second RAT 14 of the figure and the dual-RAT mobile station 10 is shown by a radio signal 16 in the figure. In the prior art, if the second RAT 14 performs continuous transmission during for instance active transmission of audio in a speech call, the mobile station 10 needs to implement two receivers to allow simultaneous measurements on the target RAT 12. Alternatively, special gaps need to be created in transmission of the originating RAT 14 to allow breaks, during which the mobile station 10 can switch to measure the transmission of the target RAT 12, according to the prior art.

Unfortunately, implementing dual receivers in the dual-RAT mobile station 10 increases terminal cost and to some extent also power consumption. It is also a disadvantage of the prior art that the alternative, i.e., compressed mode with measurement breaks allows only limited length measurement gaps and forces a rise in transmission power of the compressed part to maintain the data rate. In some cases, the data rate may need to be dropped to prevent going over the terminal maximum power or creating unsustainable interference to neighbors in the originating RAT 14.

According to the present invention, instead of having the dual-RAT mobile station equipped with dual receivers or using compressed mode with measurement breaks for a single receiver mobile station, the first RAT or target RAT 12 transmits information such as pilot and synchronization information as shown by a radio link 18 on a carrier having the same frequency ($f_1$) as that of the downlink 16 of the originating RAT 14. The downlink 18 from the first RAT 12 also uses the same physical layer format of the downlink 16 of the second RAT 14.

Applicability of this invention is currently foreseen especially when the second RAT 14: (1) uses continuous transmission and reception on dedicated channels, and (2) is capable of receiving several transmissions on the same carrier and physical layer format, such as a CDMA system. The benefit is that the dual-RAT mobile station 10 in conjunction with the second RAT 14 can perform measurements to determine the pilot strength and synchronization of the first system by receiving this special transmission 18 on the channel of the first RAT 12. Consequently, a costly dual receiver in the dual-RAT mobile station is not necessary. Compression of a frame transmission to allow measurement gaps would also not be necessary.

Consequently, the present invention makes an inter-system handover easier. It is for use in two or more mobile telecommunications systems having distinct radio access technologies 12, 14. The first RAT 12 will include a transmitter 20 for transmitting a pilot signal 18 from a base station of the first RAT used in the first mobile telecommunications system on a carrier 18 having a frequency ($f_1$) used by the second RAT 14, i.e., which is used in the second mobile telecommunications system. The pilot signal 18 is received in the dual-RAT mobile station 10 which is capable of operating in both the first mobile telecommunications system using the first RAT 12 and in the second mobile telecommunications system using the second RAT 14. A receiver 22 in the dual-RAT mobile station receives the pilot signal 18 and provides same on a line 24 to a pilot signal evaluator 26. Similarly, the receiver 22 receives the downlink 16 from the second RAT 14 and provides, e.g., a broadcast control channel signal (BCCH) on a line 28 to an evaluator 30.

Both the pilot signal evaluator 26 and the BCCH evaluator 30 provide respective power indication signals on lines 32, 34 to a determiner 36 for determining, at least preliminarily, whether to carry out an inter-system handover from operating the mobile station 10 in the second mobile telecommunication system using the second RAT 14 to operating the mobile station 10 in the first telecommunications system using the second RAT 12.

One way to do this is for the pilot signal evaluator 26 and the BCCH evaluator 30 to measure the signal strength of the pilot signal and the broadcast signal, respectively. The results of these measurements are provided on the lines 32, 34 to the determiner 36 for determining a power ratio between the two signals. This power ratio can be used as a basis for the mobile station determining, at least preliminarily, to make a handover or not. In the event that the mobile station 10 does not make this determination on its own (or even at all), provision is made for providing a signal on a line 38 to a transmitter 40 which provides the power ratio indication on a signal line 42 for transmission on an uplink 44 to the second RAT 14. In that case, the second RAT has a decider 46 for deciding whether an inter-RAT handover is appropriate or not, based on the information provided on the uplink 44. This decision can be communicated to the mobile station 10 in the downlink 16 and to the other system 12 via a not-shown network at a higher hierarchical level. If the second RAT 14 is a WCDMA system operating in FDD (frequency division duplex) mode, the uplink 44 will have a carrier frequency different from that of the downlink 16.

The pilot signal evaluator 26 may also provide a function of determining synchronization of the first RAT 12 and providing a signal indication thereof on a line 48 to a synchronization means 49 or to some other entity (not shown) within the mobile station 10 for use in synchronizing with the first RAT 12 in case a handover from the second RAT 14 to the first RAT 12 is decided. If not decided in the mobile station 10, such a decision could be made by the decider 46 in the second RAT 14 and communicated on the downlink 16 to the mobile station 10, as mentioned above. In that case, the synchronization information on the line 48 would be used by the dual-RAT mobile station in transferring its operational mode from operating according to the second RAT 14 to operating according to the first RAT 12.

Of course, it will be understood that the first RAT 12 and the second RAT 14 will also be in communication with each other, preferably over various higher-level network connections. It will also be understood that the pilot signal 18 must contain information indicative of configuration parameters needed by the dual-RAT mobile station 10 to operate in the first RAT 12. It will also be understood that the frequency used by the second RAT 14 in the second mobile telecommunications system 14 may be communicated to the first mobile telecommunications system 12 for use by the base station 11 in the transmission of the pilot signal on the carrier used in the second RAT 14. This may be communicated through the above-mentioned various network connections.

It will also be understood that if the first RAT 12 is a GSM system it is based on TDMA and therefore there will be time slots available to transmit the pilot 18. The pilot signal 18 may also be indicative of a reduced time division multiple access frame number counter, of a cell identity code applicable in the first RAT 12 of the first mobile telecommunications system, as well as other parameters which may be useful.

It will be realized that in improving inter-system handovers in this way, it will be necessary for each first RAT 12 cell to provide a pilot such as described above. For instance, if the intention is to improve 3G to 2G inter-RAT handover (UTRAN or WCDMA to GSM), a GSM pilot is needed for each GSM cell. The GSM pilot would be transmitted on the UTRAN operating frequency (or frequencies). Transmission on a single frequency would be sufficient if a similar method is first used between UTRAN frequencies and UTRAN to GSM handover would be supported on a single UTRAN carrier. In a preferred implementation, the GSM pilot would use UTRAN L1 format. The frame length for the pilot info could be the shortest time that is a multiple of frame lengths of both systems (or a multiple of that), 120 milliseconds in a preferred example case. A longer frame could be used to allow lower pilot power.

In this preferred embodiment, the UTRAN system info should include: (1) parameters that describe the power ratio between the GSM pilot and the BCCH carrier of the corresponding cell; (2) information about the actual BCCH frequency should be provided (in an alternative implementation all this can be included into the pilot which makes system control simple but the GSM pilot would use more UTRAN capacity); (3) minimum information carried on the GSM pilot would include reduced TDMA frame number counters similar to those in the base station identity code (BSIC) burst but adapted to the GSM pilot frame length; (4) in addition, the GSM cell identity code (as in the BSIC burst) should be included (in GSM this is not more than 25 bits plus 10 CRC bits); (5) additional info may be added if further improvements are sought (for example SI ¾ type info that can be used in idle mode); and (6) based on the reduced frame number info and the known frame start time of the GSM pilot, the mobile terminal can calculate the GSM TDMA frame timing.

The GSM pilot would thus provide all the information that the mobile terminal would otherwise find by RXLEV monitoring and BSIC decoding from the BCCH carrier of the corresponding GSM cell. This enables "non blind" inter-system handover from UTRAN to GSM without any need for dual receivers or compressed mode.

The most likely implementation variant is a method where only the physical layer is specified as WCDMA and the GSM pilot and synchronization information are transmitted using this new physical channel on the WCDMA carrier using GSM frame timing. The mobile terminal can then allocate some receiver capacity (RAKE fingers, in the most common form of implementation) to measure the signal.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method for use in making a handover decision between two mobile telecommunications systems using distinct radio access technologies, comprising the steps of:

transmitting a pilot signal (18) from a base station (11) of a first radio access technology (RAT) (12) used in a first mobile telecommunications system on a carrier having a frequency ($f_1$) used by a second RAT (14) used in a second mobile telecommunications system, and receiving (22) said pilot signal in a dual-system mobile station (10) capable of operating in both said first mobile telecommunications system using said first RAT and in said second mobile telecommunications system using said second RAT for evaluating (26) said pilot signal for determining (36, 46) whether to carry out an intersystem handover from operating said mobile station in said second mobile telecommunications system using said second RAT to operating said mobile station in said first telecommunications system using said first RAT wherein said pilot signal contains information indicative of configuration parameters needed by said dual-system mobile station (10) to operate in the first RAT.

2. The method of claim 1, wherein said evaluating comprises the steps of measuring signal strength of said pilot signal and providing a signal indication (34) thereof.

3. The method of claim 2, wherein said evaluating further comprises the step of determining synchronization of the first RAT and providing a signal indication (48) thereof.

4. The method of claim 1, wherein said evaluating further comprises the steps of determining synchronization of the first RAT and providing a signal indication (48) thereof.

5. The method of claim 1, wherein said first RAT is a second generation (GSM) mobile telecommunication system.

6. The method of claim 1, further comprising the step of communicating said frequency used by the second RAT in the second mobile telecommunications system to said first mobile telecommunications system for use by said base station (11) in said transmitting said pilot signal (18) on said carrier.

7. The method of claim 1, wherein said evaluating and determining includes determining a power ratio between said pilot signal carrier and a broadcast control channel (BCCH) carrier of said second RAT in said second mobile telecommunications system.

8. The method of claim 7, wherein said determining further includes transmitting a signal (38, 42) having a magnitude indicative of said power ratio to a base station (13) of said second RAT (14) in said second mobile telecommunications system.

9. The method of claim 1, wherein said pilot signal includes information indicative of a reduced time division multiple access frame number counter.

10. The method of claim 1, wherein said pilot signal includes information indicative of a cell identity code applicable in said first RAT of said first mobile telecommunication system.

11. The method of claim 1, further comprising the step of calculating in said second RAT frame timing in said first RAT based on a reduced time division multiple access frame number counter indication provided on said pilot signal and on a received frame start time of said pilot signal.

12. A dual-system mobile station (10) capable of operating in both a first mobile telecommunications system using a first radio access technology (RAT) (12) and in a second mobile telecommunications system using a second RAT (14), comprising:
- a receiver (22) for receiving a pilot signal (18) for providing a strength signal (24) having a magnitude indicative of a strength thereof; and
- a pilot signal evaluator (26), responsive to said strength signal (24) from said receiver (22) for evaluating said strength signal for determining whether to carry out an inter-system handover from operating said mobile station in said second mobile telecommunications system using said second RAT to operating said mobile station in said first telecommunications system using said first RAT and for providing a signal (34) indicative thereof wherein said pilot signal contains information indicative of configuration parameters needed by said dual-system mobile station (10) to operate in the first RAT.

13. The mobile station of claim 12, wherein said signal (34) provided by said evaluator (26) is indicative of a measured signal strength of said pilot signal and wherein said mobile station (10) further comprises a determiner (36) for comparing said signal strength signal to a signal strength of a broadcast carrier of said second mobile telecommunications system using said second RAT for providing a power ratio signal (38) for transmission to said second mobile telecommunications system using said second RAT for use by said second mobile telecommunications system using said second RAT in deciding whether to carry out said inter-system handover.

14. The mobile station of claim 13, wherein said mobile station further comprises an evaluator (30) responsive to a signal (28) from said receiver (22) having a magnitude indicative of said broadcast carrier of said second mobile telecommunications system using said second RAT for providing a signal (32) having a magnitude indicative of said broadcast carrier signal strength.

15. A base station (11) of a second generation (GSM) mobile telecommunication system having an antenna for radiating signals to mobile stations in a cell thereof, characterized by a pilot signal transmitter (20) for transmitting a pilot signal (18) having a carrier frequency identical to that of a carrier of a radio access technology (14) of a third generation mobile telecommunication system, said pilot signal for conveying information relating to its identity and configuration parameters needed by a dual-system mobile station capable of operating in both said second and third mobile telecommunications systems for use in making a handover decision to change from operating in said third generation mobile telecommunication system to operating in said second generation mobile telecommunications system wherein said pilot signal contains information indicative of configuration parameters needed by said dual-system mobile station (10) to operate in the first RAT.

* * * * *